United States Patent [19]

Jones

[11] 4,070,388
[45] Jan. 24, 1978

[54] POLYMERIC MATERIALS WITH ACID END GROUPS

[75] Inventor: Frank N. Jones, Louisville, Ky.

[73] Assignee: E. I. Du Pont de Nemours and Company, Wilmington, Del.

[21] Appl. No.: 742,532

[22] Filed: Nov. 10, 1976

Related U.S. Application Data

[60] Division of Ser. No. 622,429, Oct. 14, 1975, Pat. No. 4,029,861, which is a continuation-in-part of Ser. No. 329,154, Feb. 2, 1973, abandoned, which is a continuation-in-part of Ser. No. 133,423, April 12, 1971, abandoned, which is a continuation-in-part of Ser. No. 39,533, May 21, 1970, abandoned.

[51] Int. Cl.² .............. C07C 153/09; C07C 143/90; C11C 3/00; C07C 101/26
[52] U.S. Cl. .............. 260/455 A; 260/399; 260/404.5; 560/158
[58] Field of Search .............. 260/455 A, 482 B, 399, 260/404.5

[56] References Cited

U.S. PATENT DOCUMENTS 3,488,377  1/1970  Krenzer et al. .............. 260/455 A
3,817,944  6/1974  Jones .............. 260/455 A

*Primary Examiner*—Lewis Gotts
*Assistant Examiner*—Robert C. Whittenbaugh

[57] ABSTRACT

Polymeric materials represented by the general structure

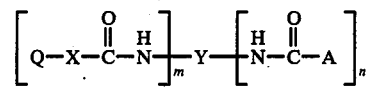

where
- Q is a polymeric segment of ethylenically unsaturated monomers, lacking Zerewitinoff hydrogen atoms;
- X is the residue of a chain transfer agent;
- Y is the residue of a di-, tri- or tetraisocyanate radical after removal of isocyanate groups;
- A is the residue of an acid radical having a $pk_a$ value of $-1$ to 6; and
- m and n are 1, 2 or 3, (the total not exceeding 4), are useful as aids for dispersing solid particles in organic liquids.

14 Claims, No Drawings

POLYMERIC MATERIALS WITH ACID END GROUPS

CROSS-REFERENCE TO RELATED APPLICATIONS

This is a division of application Ser. No. 622,429, filed Oct. 14, 1975, and now U.S. Pat. No. 4,029,861 granted June 14, 1977. That case is a continuation-in-part of application Ser. No. 329,154, filed Feb. 2, 1973; which in turn is a continuation-in-part of application Ser. No. 133,423, filed Apr. 12, 1971; which in turn is a continuation-in-part of application Ser. No. 39,533, filed May 21, 1970, all now abandoned.

STATEMENT OF THE INVENTION

This invention relates to polymeric materials. It is more particularly directed to polymeric materials represented by the structure

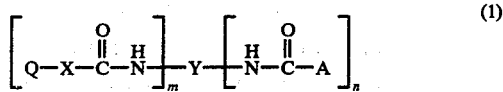  (1)

where
- Q is a polymeric segment of ethylenically unsaturated monomers, lacking Zerewitinoff hydrogen atoms;
- X is the residue of a chain transfer agent;
- Y is the residue of a di-, tri- or tetraisocyanate radical after removal of isocyanate groups;
- A is the residue of an acid radical having a $pk_a$ value of $-1$ to 6;

and
$m$ and $n$ are 1, 2 or 3, (the total not exceeding 4).
Where $n$ is 2 or 3, only one of A need be as defined.

Utility

The polymeric materials of the invention are useful as aids for dispersing solid particles in organic liquids.

They are especially useful as aids for dispersing pigments in organic liquids. Illustrative of the pigments which can be dispersed are titanium dioxide, carbon black, zinc oxide, lead titanate, potassium titanate, antimony oxide, lithopone, phthalocyanine blue, quinacridone, "Irgazine" ® yellow, ferric hydrates and the like.

Pigment dispersions made with the polymeric materials of the invention are remarkably resistant to flocculation, which gives the paints into which the dispersions are incorporated higher initial gloss, better hiding and tinting strength, and makes them resistant to color drift and gloss loss. These pigment dispersions can also be used satisfactorily with many more diverse types of paints than conventional pigment dispersions. Moreover, a dispersion made with a polymeric material of the invention can have a significantly higher pigment content, while retaining the same degree of fluidity, than when conventional aids are used.

The polymeric materials of the invention can be used as pigment dispersing aids by dissolving from 0.001 to about 2.00 grams of polymeric material per square meter[1] of surface area of the pigment to be used, preferably 0.004 to about 0.100 gram per square meter, in an organic liquid compatible with the paint into which the pigment dispersion is to be incorporated. Illustrative of organic liquids which can be used are aliphatic and aromatic hydrocarbons, ethers, esters, ketones, alcohols and mixtures of these.

Measured by the Braunauer, Emmett and Teller nitrogen adsorption method described on pp. 29-32 of "Colloidal Dispersions" by Earl K. Fisher, published by John Wiley and Sons in 1950.

An appropriate amount of pigment is then added to the solution, which is then subjected to shear or crushing, as by sand-grinding, 2-roll milling or ball-milling, to deagglomerate and disperse the pigment. This pigment dispersion or mill base can then be added directly to a paint in the usual way and amount.

Polymeric materials of the invention preferred for use as pigment dispersing aids are those of formula (1) wherein A is a mercapto-, hydroxy- or carboxy substituted carboxylic acid radical. Especially preferred are those materials where A is

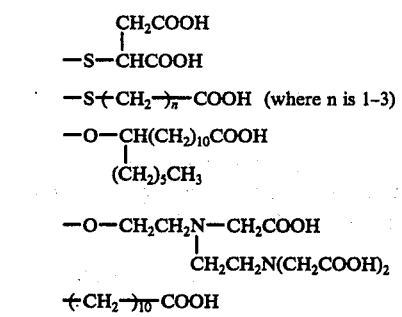

Also preferred are the polymeric materials of formula (1) wherein Q is a resinous or non-resinous polymeric or copolymeric segment of
- a. an ester of acrylic acid (AA) or methacrylic acid (MAA) with an alkanol of 1–18 carbon atoms;
- b. styrene or acrylonitrile;
- c. a vinyl ester derived from an acid of 2 through 18 carbon atoms;

or
- d. a vinyl ether.

"Resinous", as used in this context, refers to a polymeric segment having a number average molecular weight of about 10,000–100,000. "Non-resinous", as used in this context, refers to a polymeric Q segment having a number average molecular weight of 500–10,000.

Number average molecular weight is determined by dynamic membrane osmometric techniques using a Mechrolab 501 Osmometer, sold by the Mechrolab, Inc. division of Hewlett-Packard Co., Mountain View, Calif.

Especially preferred are those polymeric materials of formula (1) wherein Q is a resinous or non-resinous
1. polymeric segment one of whose monomer units is methyl methacrylate (MMA)
2. copolymeric segment of MMA and an ester of AA or MAA with an alkanol of 2–12 carbon atoms, or
3. MMA/2-ethylhexyl acrylate (2EHA) copolymeric segment.

Polymeric materials of the invention also preferred are those of formula (1) wherein X is

—S—R—Z— where R is alkylene of 1–6 carbon atoms,
and

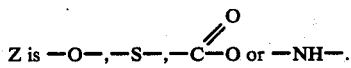

Z is $-O-, -S-, -\overset{\overset{O}{\|}}{C}-O$ or $-NH-$.

Also especially preferred are those polymeric materials of formula (1) wherein Y is

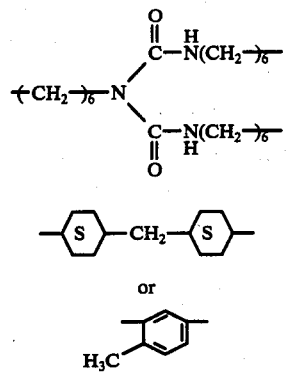

From all this it will be clear that the polymeric material most preferred for use as a pigment dispersing aid is that represented by the structure

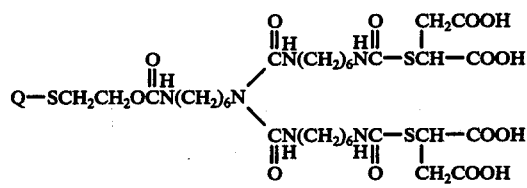

Preparation of the Polymeric Materials

The materials of the invention can be prepared according to the illustrative equation (1) MMA + 2EHA + HSCH$_2$CH$_2$OH $\longrightarrow$ MMA/2EHA polymer . SCH$_2$CH$_2$OH (2) MMA/2EHA polymer . SCH$_2$CH$_2$OH +

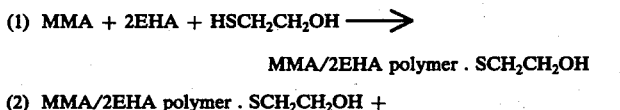

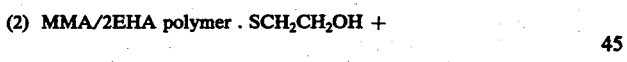

(3) MMA/2EHA polymer .

HOOC(CH$_2$)$_2$CH(SH)COOH $\longrightarrow$ MMA/2EHA polymer .

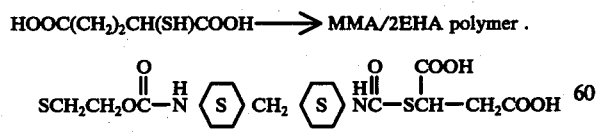

According to this scheme, a suitable organic liquid such as toluene, methylethyl ketone, methylisobutyl ketone, butyl acetate, ethyl acetate, benzene, xylene, an ether such as ethylene glycol diethyl ether or Cellosolve acetate, or mixtures of these, is brought to a temperature of 50°–120° C. To this organic liquid is then added, over a four-hour period, a solution of the monomer(s) which is to produce the polymeric segment B of the polymeric material, a chain transfer agent bearing functional groups such as 2-mercaptoethanol, 2-mercaptopropanol or 2-hydroxyethyl disulfide and a free radical polymerization initiator such as azobisisobutyronitrile.

One chooses the proportions of monomer, chain transfer agent and initiator according to the formula $$MW_n = \frac{\text{total mols monomer}}{\text{total mols transfer agent} + X(\text{mols of initiator})}$$

(where X is the number of free radicals per mol of catalyst and $MW_n$ is the number average molecular weight of the polymer desired).

It is usually desirable that the monomer, chain transfer agent and initiator be in solution. If they are not, enough of an appropriate solvent such as Cellosolve acetate or toluene should be added to put them into solution.

The reaction mass is then heated at 50°–120° C. until reaction is about 95% complete, as determined by viscosity measurements. Ordinarily, at completion, the mass has a Gardner-Holdt viscosity of F to N. One or two hours of heating is ordinarily enough.

An appropriate di, tri- or tetraisocyanate, in an amount equimolar to the chain transfer agent, is then added to the reaction mass, still at elevated temperature. Illustrative of isocyanates which can be used are

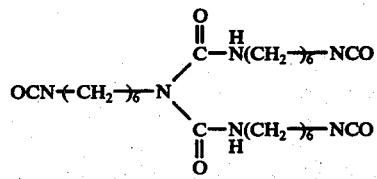

(Desmodur N, sold by Farbenfabriken Bayer, AG.)

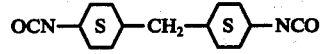

("Hylene" ® W organic isocyanate, sold by "E. I. du Pont de Nemours and Company")

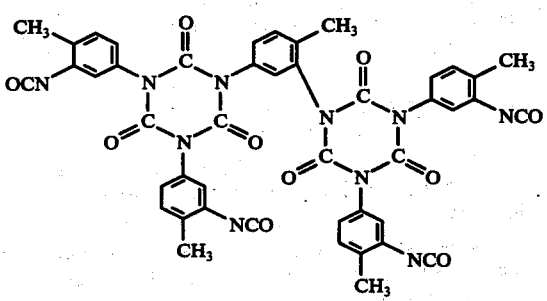

(Desmodur IL, sold by Farbenfabriken Bayer, AG)

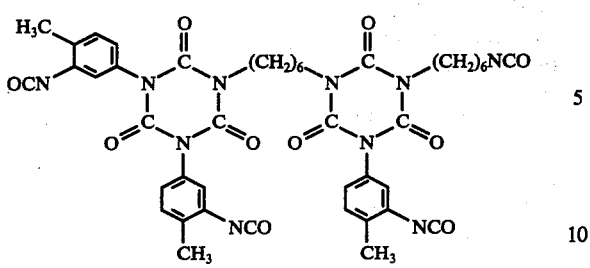

(Desmodur HL, sold by Farbenfabriken Bayer, AG) and toluene diisocyanate

A catalyst for the isocyanate reaction is then added to the reaction mass. Illustrative are dibutyltin dilaurate and tertiary amines such as triethylenediamine. The amount of catalyst used is ordinarily 0.5 to about 2%, by weight of the isocyanate used.

The reaction mass is then heated until the isocyanate-chain transfer agent reaction is complete. This ordinarily takes from 5 to 60 minutes at 80° C.

The reactant which provides the A moiety of the polymeric material is then added as a solution, preferably dry, in one of the organic liquids previously mentioned. The amount used is about 0.8–1, preferably 0.95 molar, based on the unreacted ioscyanate. The reaction is then heated at 50°–120° C., with stirring, for another fifteen minutes. Heat, however, need not be applied when mercapto acids are used because they react readily at 25° C.

This A moiety-providing reactant can be any acid which will leave a residue having a $pk_a$ value of −1 to 6 and bearing a radical capable of reacting with an isocyanate, such as —COOH, —SH, —OH and —NH$_2$. Illustrative of these acid reactants are

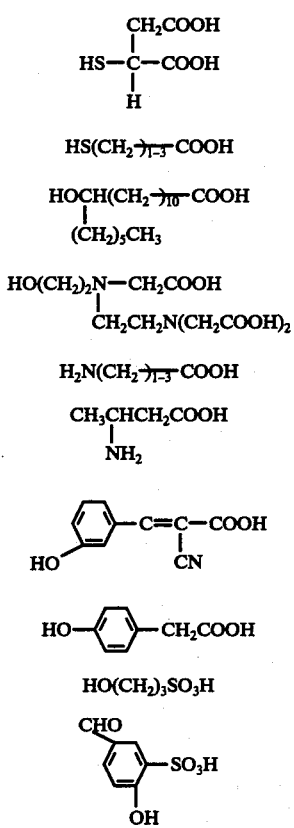

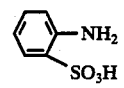
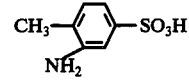
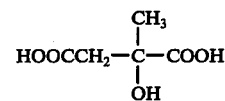
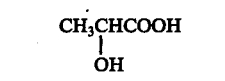
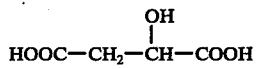
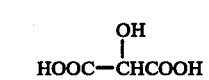
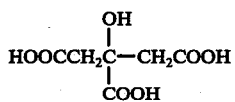

The organic liquid can be stripped from the reaction mass by heating under vacuum to give a polymeric material of the invention. In practice, the product is ordinarily used in solution, as prepared.

If mixtures of polymeric materials are produced by these reactions, the materials can be isolated by chromatography.

PREFERRED EMBODIMENTS OF THE INVENTION

The following examples are submitted so that the invention may be more readily understood and practiced.

Those skilled in the art will, no doubt, be able to compose numerous variations on their central theme, such as the attachment of innocuous substituents to the polymeric material molecule. It is naturally considered that these variations are a part of the invention.

In the examples, all parts are by weight.

EXAMPLE 1

A. Toluene (226.7 parts) was placed in a steel reaction kettle, heated to reflux temperature and held there. A solution of 226.7 parts of MMA, 126 parts of 2-EHA, 90.7 parts of toluene, 4.44 parts of 2-mercaptoethanol and 0.903 part of azobisisobutyronitrile was then slowly added to the kettle over a four hour period.

Refluxing was continued as a solution of 0.25 part of azobisisobutyronitrile in 2.5 parts of methylisobutyl ketone was added in three equal portions at fifteen minute intervals. A water separator was attached to the kettle and refluxing was continued for another forty-five minutes.

B. Desmodur N(43.21 parts) was then added to the reaction mass and its container rinsed with 3.78 parts of toluene, which was also added to the mass. The mixture was stirred for five minutes.

Dibutyltin dilaurate (0.51 part) was then added and its container rinsed with 1.89 parts of toluene, which was also added to the mixture.

This solution was refluxed for 1 hour.

C. The solution was then cooled to about 65° C. and stirred as a solution of 17.09 parts of mercaptosuccinic acid in 120.9 parts of methylethyl ketone was added. The container was rinsed with 3.78 parts of methylethyl ketone, which was also added to the solution. After thirty minutes of stirring at 60°-75° C., 0.85 part of acetic anhydride was added.

The resulting product was a solution, 48% solids, containing a polymeric material having the general formula

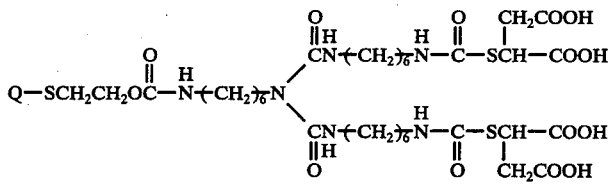

where Q is a MMA/2EHA polymeric segment.

A mixture of 62.5 parts of this solution, 65 parts of phthalocyanine blue pigment, 168 parts of xylene and 66 parts of 2-butoxyethyl acetate was sandmilled to produce a fluid dispersion. This dispersion was then mixed with a clear thermosetting acrylic enamel vehicle in the ratio of 2 parts of pigment per 100 parts of polymeric binder. The resulting homogeneous enamel was doctor-bladed to a glass panel and baked at about 160° C. to give a highly transparent glossy blue film.

EXAMPLE 2

Toluene (900 parts) was placed in a reaction flask, heated to reflux temperature and held there. To the toluene was then added, continuously over a four hour period, a solution of 1540 parts of MMA, 20.3 parts of 2-mercaptoethanol, 4.1 parts of azobisisobutyronitrile and 300 parts of toluene.

Refluxing was continued while a solution of 3.4 parts of azobisisobutyronitrile in 38 parts of methyl-isobutyl ketone was added in three equal portions at fifteen minute intervals. Refluxing was then continued for another thirty minutes, with water removal.

Desmodur N (197.3 parts) was then added to this solution and its container rinsed with 17 parts of toluene, which was also added.

After the mass had been stirred another five minutes, 1.2 parts of dibutyltin dilaurate were added. This solution was heated at reflux temperature for 30 minutes and then cooled to 65° C.

To this solution was then added a solution of 74.1 parts of mercaptosuccinic acid in 520 parts of methylethyl ketone. The container was rinsed with 20 parts of methylethyl ketone, which was also added to the mass. The resulting solution was then stirred for fifteen minutes at 60-70° C. and 4 parts of acetic anhydride were added.

The resulting product was a solution, 46% solids, containing a polymeric material represented by the formula

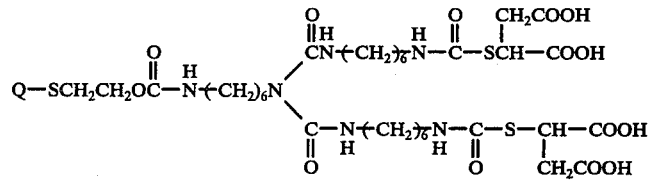

where Q is a poly(MMA) segment.

A mixture of 1 part of this solution, 1 part of phthalocyanine blue pigment and 8 parts of xylene was sand-ground. The viscosity of the resulting dispersion was less than 20 centipoise, indicating excellent deflocculation.

EXAMPLE 3

A polymeric material was prepared by the method of Example 2, using 1312 parts of MMA and 288 parts of butyl acrylate (BA) in place of the 1540 parts of MMA.

EXAMPLE 4

A polymeric material was prepared by the method of Example 2, except that the first feed solution was composed of 1170 parts of lauryl methacrylate (LMA), 270 parts of ethyl acrylate (EA), 360 parts of MMA, 20.2 parts of 2-mercaptoethanol, 4.1 parts of azobisisobutyronitrile and 300 parts of toluene.

The resulting solution contained a polymeric material represented by the formula

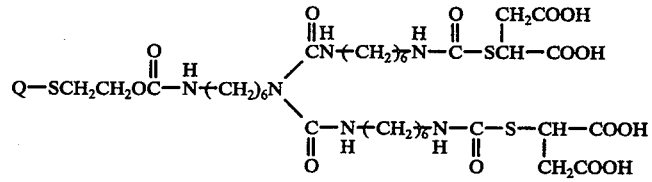

where Q is a LMA/EA/MMA polymer segment.

EXAMPLE 5

A polymeric material was prepared by the method of Example 2, except that the first feed solution was composed of 1120 parts of MMA, 368 parts of LMA, 112 parts of acrylonitrile (AN), 22.42 parts of 2-mercaptoethanol, 3.98 parts of azobisisobutyronitrile and 300 parts of toluene.

EXAMPLE 6

To the intermediate polymeric material prepared in part (B) of Example 1 was added 1 mol of thioglycollic acid for each equivalent weight of unreacted isocyanate.

The mixture was heated at reflux temperature for one hour to give a solution containing a polymeric material represented by the general formula

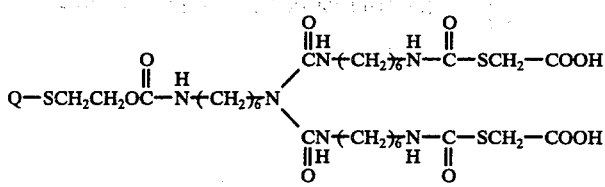

where Q is a MMA/2EHA polymeric segment.

EXAMPLE 7

The procedure of Example 6 was repeated, except that β-mercaptopropionic acid was used in place of the thioglycollic acid.

The product contained a polymeric material represented by the general formula

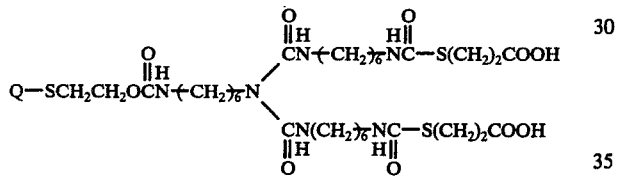

where Q is a MMA/2-EHA polymeric segment.

I claim:

1. A polymeric material represented by the structure

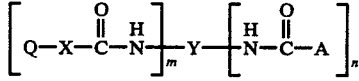

where

Q is a non-resinous polymeric or copolymeric segment of
  a. an ester of acrylic acid or methacrylic acid with an alkanol of 1–18 carbon atoms;
  b. styrene or acrylonitrile;
  c. a vinyl ester derived from an acid of 2 through 18 carbon atoms; or
  d. a vinyl ether;

X is the residue of a chain transfer agent;

Y is the residue of a di-, tri-, or tetraisocyanate radical after removal of isocyanate groups;

A is the residue of an acid radical having a $pk_a$ value of $-1$ to 6; and $m$ and $n$ are 1, 2 or 3, the total not exceeding 4, provided that when $n$ is 2 or 3, only one of A need be as defined.

2. The polymeric material of claim 1 wherein Q is a polymeric segment one of whose monomer units is methyl methacrylate.

3. The polymeric material of claim 1 wherein Q is a polymeric segment of methyl methacrylate and an ester of acrylic acid or methacrylic acid with an alkanol of 2–12 carbon atoms.

4. The polymeric material of claim 1 wherein Q is a methyl methacrylate /2-ethylhexyl acrylate polymeric segment.

5. The polymeric material of claim 1 wherein X is

—S-R-Z where R is alkylene of 1–6 carbon atoms and

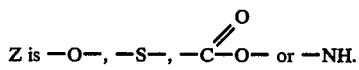

6. The polymeric material of claim 1 wherein Y is

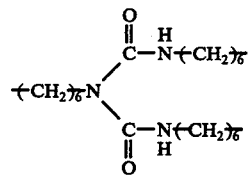

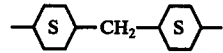

or

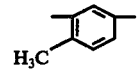

7. The polymeric material of claim 1 wherein A is a mercapto-, hydroxy- or carboxy substituted carboxylic acid radical.

8. The polymeric material of claim 2 wherein the acid radical is

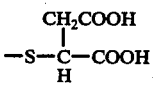

 (where n is 1-3)

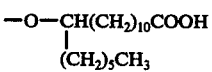

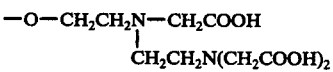

or

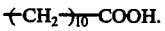

9. A polymeric material represented by the structure

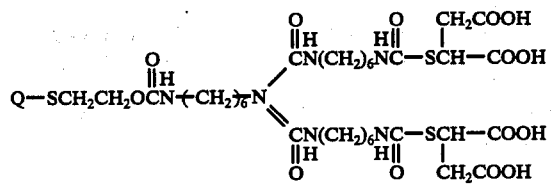

where Q is a non-resinous methyl methacrylate /2-ethylhexyl acrylate polymeric segment.

10. A polymeric material represented by the structure

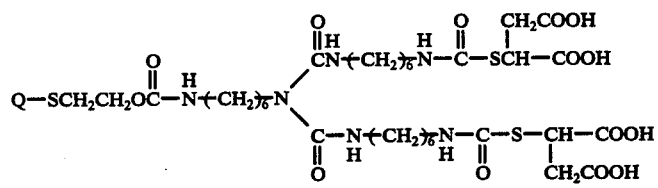

where Q is a non-resinous lauryl methacrylate/ethyl acrylate/methyl methacrylate polymer segment.

11. The polymeric material of claim 1 wherein Q is a polymeric segment one of whose monomer units is methyl methyacrylate.

12. The polymeric material of claim 1 wherein Q is a polymeric segment of methyl methacrylate and an ester of acrylic acid or methacrylic acid with an alkanol of 2-12 carbon atoms.

13. The polymeric material of claim 1 wherein Q is a methyl methacrylate/2-ethylhexyl acrylate polymeric segment.

14. The polymeric material of claim 1 wherein X is
—S-R-Z where R is alkylene of 1-6 carbon atoms and $$Z \text{ is } -O-, -S-, -\overset{\overset{O}{\|}}{C}-O- \text{ or } -NH.$$

* * * * *